(12) United States Patent
Fukushima et al.

(10) Patent No.: US 10,498,095 B2
(45) Date of Patent: Dec. 3, 2019

(54) CONNECTION MODULE

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Naoki Fukushima, Mie (JP); Osamu Nakayama, Mie (JP); Katsushi Miyazaki, Mie (JP); Tetsuya Fujita, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 16/357,839

(22) Filed: Mar. 19, 2019

(65) Prior Publication Data

US 2019/0305497 A1    Oct. 3, 2019

(30) Foreign Application Priority Data

Mar. 30, 2018   (JP) .................................. 2018-067563
Jul. 5, 2018    (JP) .................................. 2018-128153

(51) Int. Cl.
*H01M 2/24*   (2006.01)
*H01R 25/16*  (2006.01)
(Continued)

(52) U.S. Cl.
CPC .......... *H01R 25/162* (2013.01); *H01M 2/206* (2013.01); *H01M 2/26* (2013.01)

(58) Field of Classification Search
CPC .............................. H01M 2/202; H01M 2/206
(Continued)

(56) References Cited

U.S. PATENT DOCUMENTS 6,152,776 A  * 11/2000  Ikeda .................. H01M 2/1077
                                                          429/121
7,614,906 B2 * 11/2009  Kim .................... H01R 11/288
                                                          439/500

(Continued)

FOREIGN PATENT DOCUMENTS

JP        2017-174714           9/2017

*Primary Examiner* — Neil Abrams
(74) *Attorney, Agent, or Firm* — Greenblum & Bernstein, P.L.C.

(57) ABSTRACT

A connection module includes a negative electrode external connection busbar to which an external connection component is to be bolt-fastened; a positive electrode external connection busbar to which an external connection component is to be bolt-fastened; and an insulating protector configured to hold the external connection busbars in an insulated manner. The insulating protector includes a support plate portion including a support plate surface that faces and extends along an outer surface of a frame outer wall for accommodating an electricity storage element group in a state in which the connection module is attached to the electricity storage element group, at least the support plate surface being configured to abut against an outer surface of the frame outer wall so as to support the insulating protector when the external connection components are bolt-fastened to the first external connection busbar and the second external connection busbar.

8 Claims, 20 Drawing Sheets

(51) Int. Cl.
*H01M 2/26* (2006.01)
*H01M 2/20* (2006.01)

(58) Field of Classification Search
USPC .................................................. 439/637, 500
See application file for complete search history.

(56) References Cited

U.S. PATENT DOCUMENTS

| | | | | |
|---|---|---|---|---|
| 8,563,161 | B2* | 10/2013 | Ogasawara | H01M 2/1072 |
| | | | | 429/121 |
| 8,998,646 | B2* | 4/2015 | Okamoto | H01M 2/206 |
| | | | | 439/627 |
| 9,039,454 | B2* | 5/2015 | Ogasawara | H01R 9/226 |
| | | | | 439/500 |
| 9,083,095 | B2* | 7/2015 | Takase | H01M 2/1077 |
| 9,083,098 | B2* | 7/2015 | Nakayama | H01M 2/20 |
| 9,105,911 | B2* | 8/2015 | Byun | H01M 2/206 |
| 9,287,672 | B2* | 3/2016 | Nakayama | H01M 2/206 |
| 9,300,061 | B2* | 3/2016 | Kinoshita | H01M 2/1061 |
| 9,350,127 | B2* | 5/2016 | Callicoat | H01R 25/16 |
| 9,368,779 | B2* | 6/2016 | Nakayama | B60L 50/51 |
| 9,905,832 | B2* | 2/2018 | Nakayama | H01M 2/206 |
| 9,960,401 | B2* | 5/2018 | Takase | H01M 2/206 |
| 10,122,005 | B2* | 11/2018 | Fukushima | H01M 2/1077 |
| 10,141,109 | B2* | 11/2018 | Nakayama | H01M 10/482 |
| 10,210,996 | B2* | 2/2019 | Kuboki | H01G 11/12 |
| 10,297,806 | B2* | 5/2019 | Nakayama | H01G 11/10 |
| 10,389,072 | B2* | 8/2019 | Fukushima | |
| 10,403,875 | B2* | 9/2019 | Subramanian | |
| 10,410,769 | B2* | 9/2019 | Fukushima | H01B 17/16 |
| 2016/0344012 | A1* | 11/2016 | Fukushima | H01M 2/34 |
| 2018/0366713 | A1* | 12/2018 | Nakayama | H01M 2/1016 |
| 2019/0051883 | A1* | 2/2019 | Fukushima | H01M 2/206 |

* cited by examiner

CONNECTION MODULE

TECHNICAL FIELD

A technique disclosed in the present specification relates to a connection module, and more particularly relates to a technique relating to connection between an external connection busbar that outputs power from an electricity storage element group to the outside and an external connection component in a connection module that is to be attached to the electricity storage element group.

BACKGROUND ART

Conventionally, as a technique relating to connection between an external connection busbar that outputs power from an electricity storage element group to the outside and an external connection component in a connection module, the technique described in JP 2017-174714A is known, for example. As shown in FIG. 1 and so forth, JP 2017-174714A describes an example in which a connection terminal portion (external connection terminal) 42 for enabling connection to an external device is provided at one end portion 40A of an external connection busbar 40 held by an insulating protector (20, 70), and the external connection busbar 40 is connected to the external device via the connection terminal portion 42.

JP 2017-174714A is an example of related art.

SUMMARY OF THE INVENTION

However, in the case where a bolt-fastening bolt hole is provided in the external connection terminal of the external connection busbar, and an external connection component is bolt-fastened to the external connection terminal with a bolt, a pressing load and a pulling load in the bolt axial direction, or a torsional load may be applied to the insulating protector in the vicinity of the bolt. Then, if such a load is large, there is concern of the load due to bolt-fastening causing deformation of the insulating protector, which is usually made of a synthetic resin, or the deformation, displacement, or the like of the insulating protector resulting in reduced reliability of the connection portion between the external connection busbar and the electricity storage elements. Therefore, there is a demand for a technique that reduces the load applied to the insulating protector due to bolt-fastening in a configuration in which an external connection component is bolt-fastened to the external connection busbar.

A technique disclosed in the present specification has been completed in view of the above-described circumstances, and provides a connection module capable of reducing the load applied to an insulating protector due to bolt-fastening in a configuration in which an external connection component is bolt-fastened to an external connection busbar.

A connection module disclosed in the present specification is a connection module that is to be attached to an electricity storage element group including a plurality of electricity storage elements each having positive and negative electrode terminals, the electricity storage element group including: a first output electrode terminal that outputs power of one polarity; a second output electrode terminal that outputs power of another polarity; and a frame outer wall that is an outer wall of a frame for accommodating the plurality of electricity storage elements, the frame outer wall being located in an arrangement direction of the plurality of electricity storage elements, the connection module including: a plurality of busbars configured to connect the positive electrode terminal and the negative electrode terminal of adjacent electricity storage elements; a first external connection busbar that is configured to be electrically connected to the first output electrode terminal, and that includes a first bolt-fastening portion to which an external connection component is to be bolt-fastened; a second external connection busbar that is configured to be electrically connected to the second output electrode terminal, and that includes a second bolt-fastening portion to which an external connection component is to be bolt-fastened; and an insulating protector configured to hold the plurality of busbars, the first external connection busbar, and the second external connection busbar in an insulated manner, wherein the insulating protector includes a support plate portion that includes a support plate surface that faces and extends along an outer surface of the frame outer wall in a state in which the connection module is attached to the electricity storage element group, at least the support plate surface being configured to abut against the outer surface of the frame outer wall so as to support the insulating protector when the external connection components are bolt-fastened to the first external connection busbar and the second external connection busbar.

With the present configuration, the support plate portion is provided including the plate surface that abuts against the outer surface of the frame outer wall when the external connection components are bolt-fastened to the first external connection busbar and the second external connection busbar. Accordingly, the load applied to the insulating protector due to bolt-fastening during bolt-fastening can be partially released to the frame outer wall. This makes it possible to inhibit damage such as deformation due to bolt-fastening from occurring in the insulating protector. That is, the load applied to the insulating protector due to bolt-fastening can be reduced in a configuration in which the external connection component is bolt-fastened to the external connection busbar. Here, the term "to abut against" used in relation to the support plate surface also encompasses "to abut against before bolt-fastening". That is, the support plate surface may abut against the outer surface of the frame outer wall before bolt-fastening. In this case as well, the load applied to the insulating protector due to bolt-fastening during bolt-fastening can be partially released to the frame outer wall.

In the above-described connection module, the insulating protector may include an inner surface abutting portion configured to abut against an inner surface of the frame outer wall when the first external connection busbar and the second external connection busbar are bolt-fastened to the external connection components.

With the present configuration, the inner surface abutting portion is provided that abuts against the inner surface of the frame outer wall when the external connection components are bolt-fastened to the first external connection busbar and the second external connection busbar. Accordingly, if the insulating protector is inclined in the horizontal direction during bolt-fastening as a result of bolt-fastening being performed in a direction shifted from the bolt axial direction during bolt-fastening, the load applied to the insulating protector due to bolt-fastening can be further partially released to the frame outer wall by the inner surface abutting portion working cooperatively with the support plate portion by abutting against the inner surface of the frame outer wall. Accordingly, it is possible to further inhibit damage such as deformation due to bolt-fastening from occurring in the insulating protector. Here, as in the case of the support plate surface, the term "to abut against" used in relation to the inner surface abutting portion also encompasses "to abut against before bolt-fastening".

In the above-described connection module, the first external connection busbar may include a first bolt-fastening portion configured to be bolt-fastened to the external connection component, the second external connection busbar may include a second bolt-fastening portion configured to be bolt-fastened to the external connection component, the frame outer wall may include an extended portion that is located on an outer side of the first bolt-fastening portion and the second bolt-fastening portion in a plan view in a state in which the connection module is attached to the electricity storage element group, and the insulating protector may include: a first abutting piece portion serving as the inner surface abutting portion configured to abut against an inner surface of the extended portion, the first abutting piece portion being formed in the vicinity of the first bolt-fastening portion; and a second abutting piece portion serving as the inner surface abutting portion configured to abut against the inner surface of the extended portion, the second abutting piece portion being formed in the vicinity of the second bolt-fastening portion.

With the present configuration, if the insulating protector is inclined in the horizontal direction during bolt-fastening, the load applied to the insulating protector due to bolt-fastening can be partially released to the frame outer wall more effectively by the first abutting piece portion and the second abutting piece portion working cooperatively with the support plate portion.

Specifically, if a force that causes the insulating protector to be inclined relative to the frame outer wall is exerted as a result of a force in a direction shifted from the bolt axial direction being applied to the bolt when performing bolt-fastening to the first bolt-fastening portion, the second abutting piece portion located at a position away from the first bolt-fastening portion can abut against the inner surface of the frame outer wall (extended portion), thus releasing the stress to the frame outer wall. On the other hand, if a force that causes the insulating protector to be inclined relative to the frame outer wall is exerted as a result of a force in a direction shifted from the bolt axial direction being applied to the bolt when performing bolt-fastening to the second bolt-fastening portion, the first abutting piece portion that is located at a position away from the second bolt-fastening portion can abut against the inner surface of the frame outer wall (extended portion), thus releasing the stress to the frame outer wall. That is, the abutting piece portion is disposed at a position away from the first bolt-fastening portion or the second bolt-fastening portion. Accordingly, if a force in a direction shifted form the bolt axial direction is applied to the bolt during bolt-fastening, the stress can be more effectively released to the frame outer wall.

In the above-described connection module, the support plate portion may include a first support plate portion located in the vicinity of the first bolt-fastening portion and a second support plate portion located in the vicinity of the second bolt-fastening portion in a state in which the connection module is attached to the electricity storage element group.

With the present configuration, the support plate portion is provided corresponding to, and separately from, the first bolt-fastening portion or the second bolt-fastening portion. Accordingly, the load due to bolt-fastening can be partially released to the frame outer wall in a manner appropriately corresponding to the positions of the bolt-fastening portions of the first external connection busbar and the second external connection busbar.

In the above-described connection module, the insulating protector may include: a first insulating protector configured to hold the plurality of busbars; and a second insulating protector configured to hold the first external connection busbar and the second external connection busbar, and the support plate portion associated with the first external connection busbar may be provided on the first insulating protector, and the support plate portion associated with the second external connection busbar may be provided on the second insulating protector.

With the present configuration, the load applied to the insulating protector due to bolt-fastening can be reduced in a configuration in which the insulating protector is separated into the first insulating protector that holds the plurality of busbars and the second insulating protector that holds the external connection busbar.

In the above-described connection module, the support plate portion may have an elongated plate shape extending in a direction perpendicular to the arrangement direction of the plurality of electricity storage elements.

With the present configuration, the support plate portion has an elongated plate shape extending in a direction perpendicular to the arrangement direction of the plurality of electricity storage elements, and, therefore, the area where the support plate portion abuts against the frame outer wall increases. Accordingly, the load due to bolt-fastening can be more effectively released to the frame outer wall.

In the above-described connection module, the inner surface abutting portion may have an elongated plate shape extending in a direction perpendicular to the arrangement direction of the plurality of electricity storage elements.

With the present configuration, the inner surface abutting portion has an elongated plate shape extending in a direction perpendicular to the arrangement direction of the plurality of electricity storage elements, and, therefore, the area where the inner surface abutting portion abuts against the frame outer wall increases. Accordingly, the load due to bolt-fastening can be more effectively released to the frame outer wall.

In the above-described connection module, the first external connection busbar may include a first fastening surface having a bolt hole through which the external connection component is to be bolt-fastened, the second external connection busbar may include a second fastening surface having a bolt hole through which the external connection component is to be bolt-fastened, and directions of perpendicular lines of the first fastening surface, the second fastening surface, the support plate surface of the support plate portion, and the outer surface of the frame outer wall may be the same direction, which is the arrangement direction of the electricity storage elements.

With the present configuration, the directions of the first fastening surface, the second fastening surface, the support plate surface of the support plate portion, and the outer surface of the frame outer wall are the same direction, which is the arrangement direction of the electricity storage elements. Accordingly, the load applied to the insulating protector due to bolt-fastening can be reduced when bolt-fastening to the first fastening surface and the second fastening surface is performed in the arrangement direction of the electricity storage elements, or in other words, in a configuration in which the first fastening surface and the second fastening surface are provided in a direction perpendicular to the terminal connection surfaces of the external connection busbars.

With the connection module disclosed in the present specification, the load applied to an insulating protector due to bolt-fastening can be reduced in a configuration in which an external connection component is bolt-fastened to an external connection busbar.

EMBODIMENTS OF THE INVENTION

Embodiment 1

Figure 11:
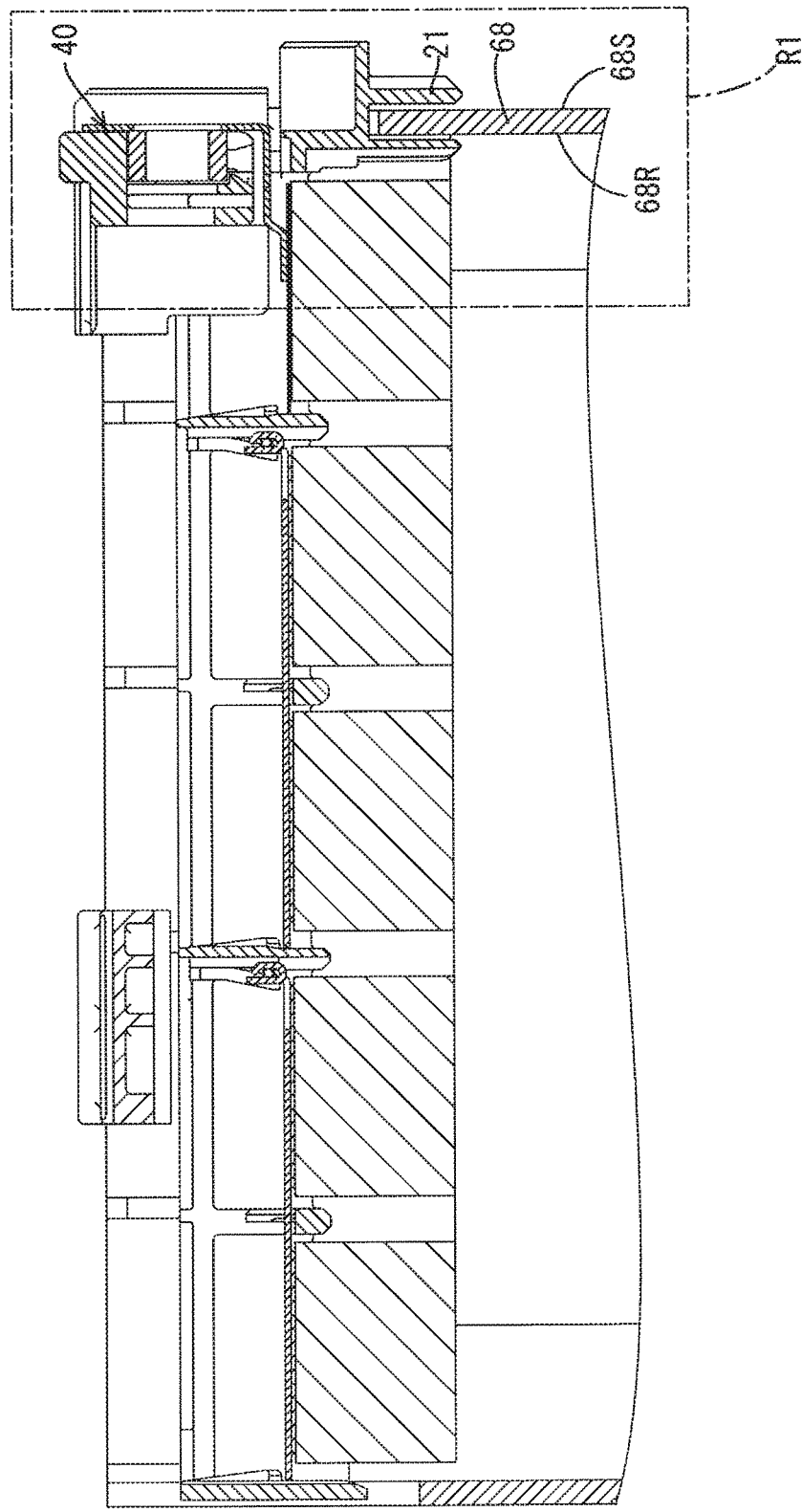
FIG. 11 is a cross-sectional view taken along a line A1-A1 in FIG. 10.
Figure 12:
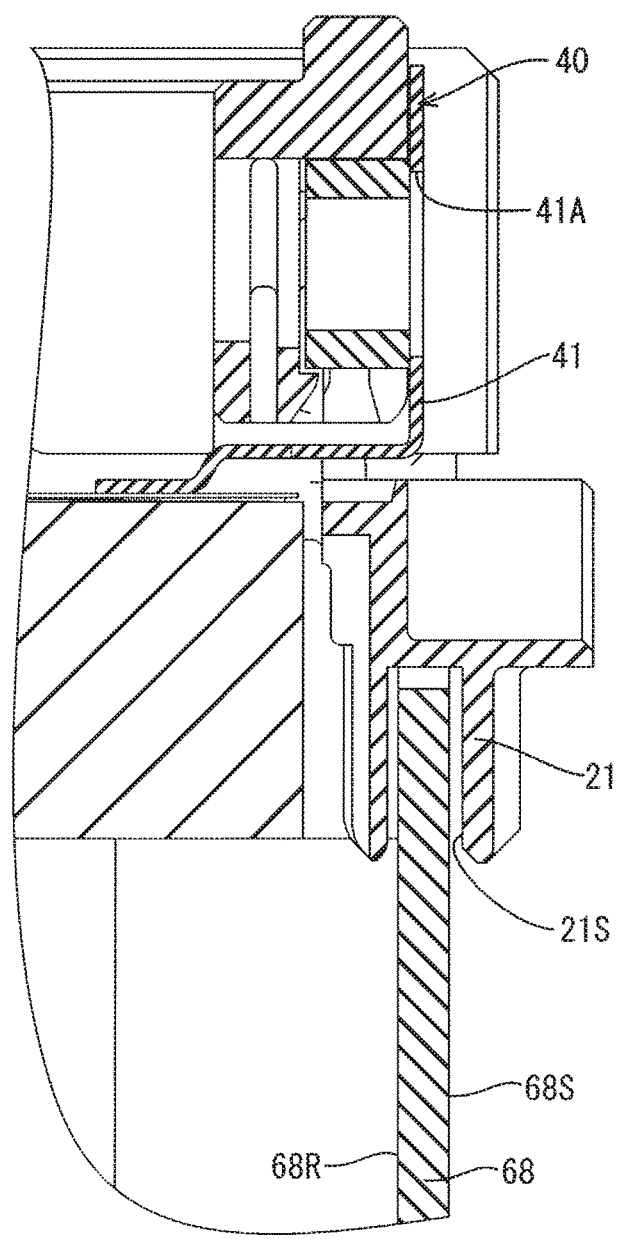
FIG. 12 is a partial enlarged view of FIG. 11.
Figure 13:
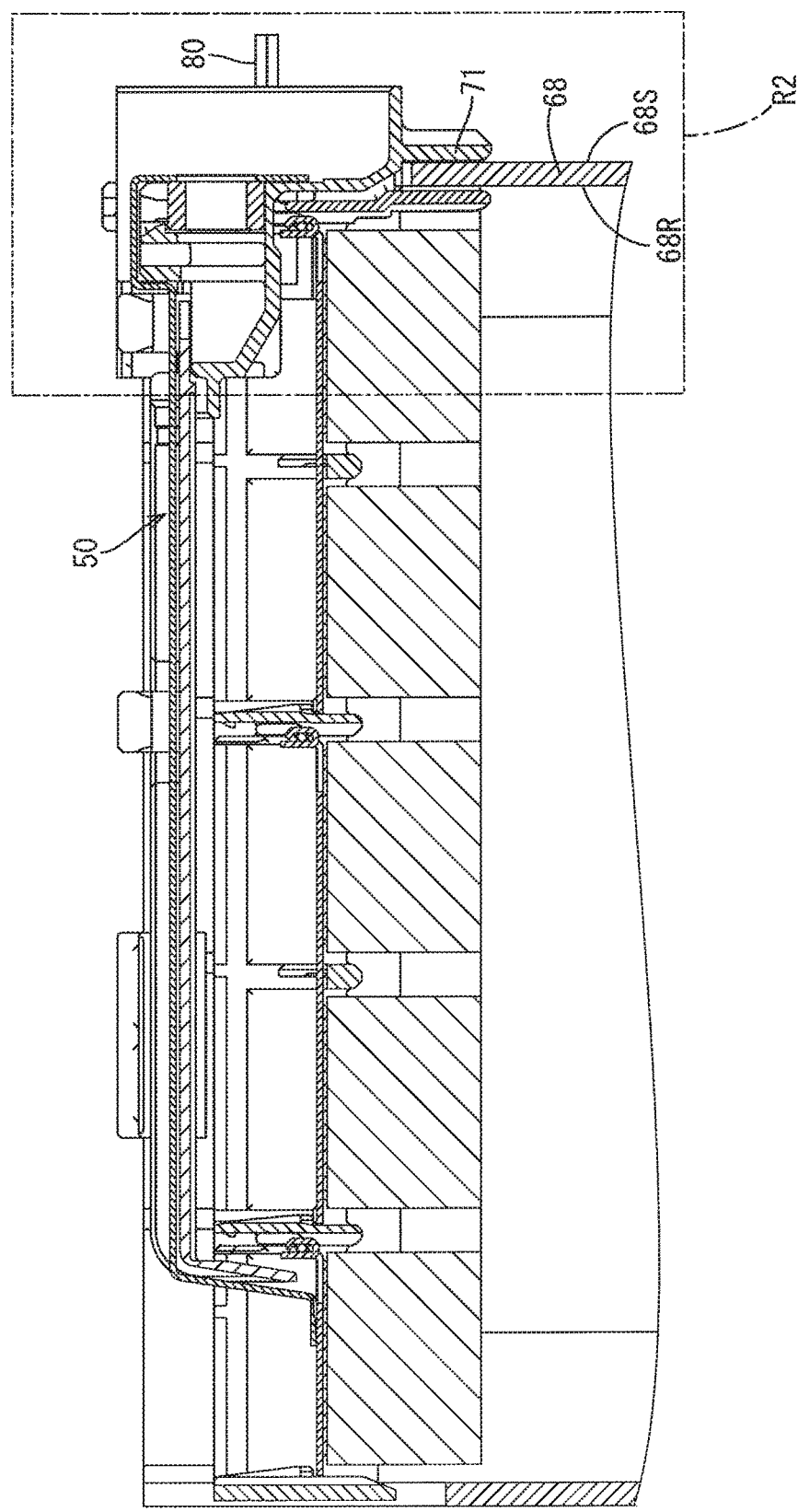
FIG. 13 is a cross-sectional view taken along a line A2-A2 in FIG. 10.
Figure 14:
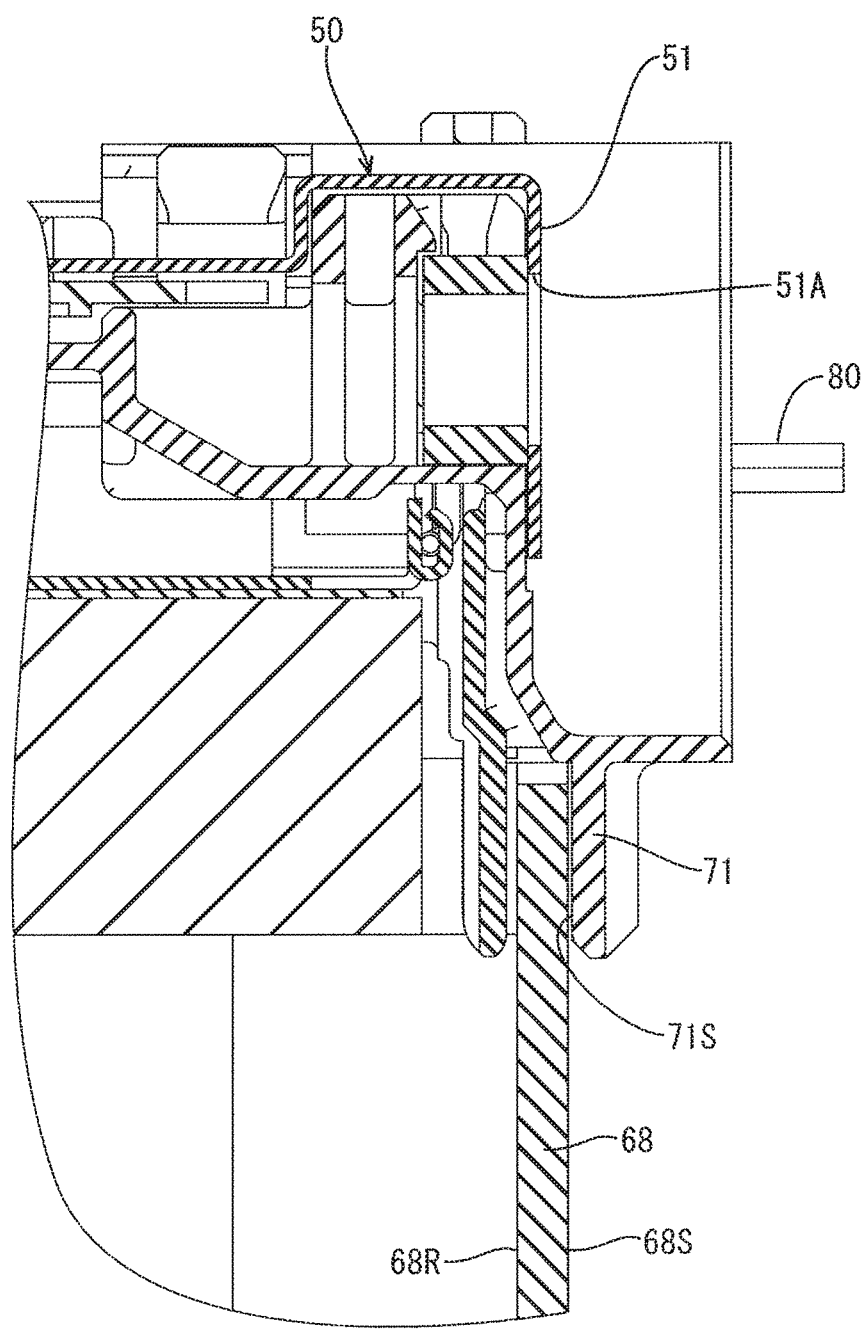
FIG. 14 is a partial enlarged view of FIG. 13.
Figure 15:
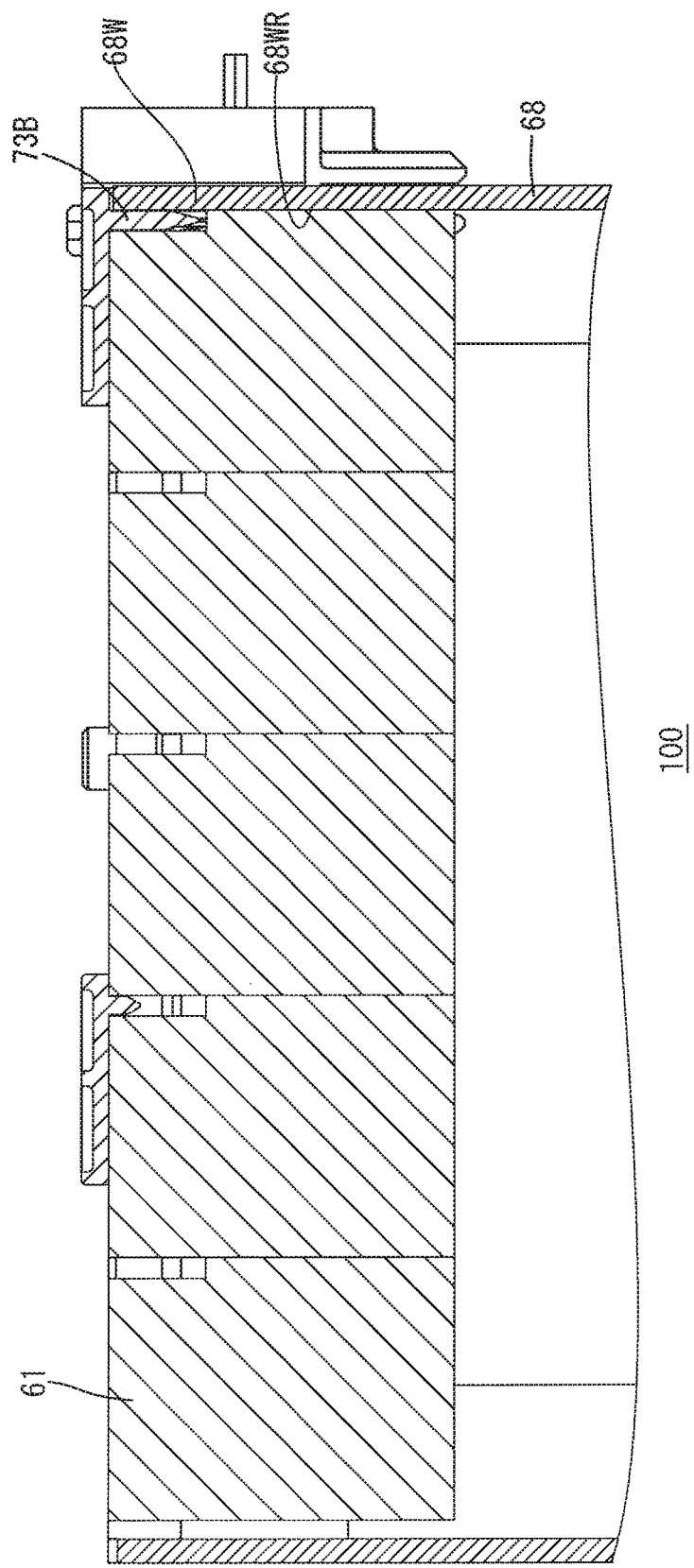
FIG. 15 is a cross-sectional view taken along a line B1-B1 in FIG. 10.
Figure 16:
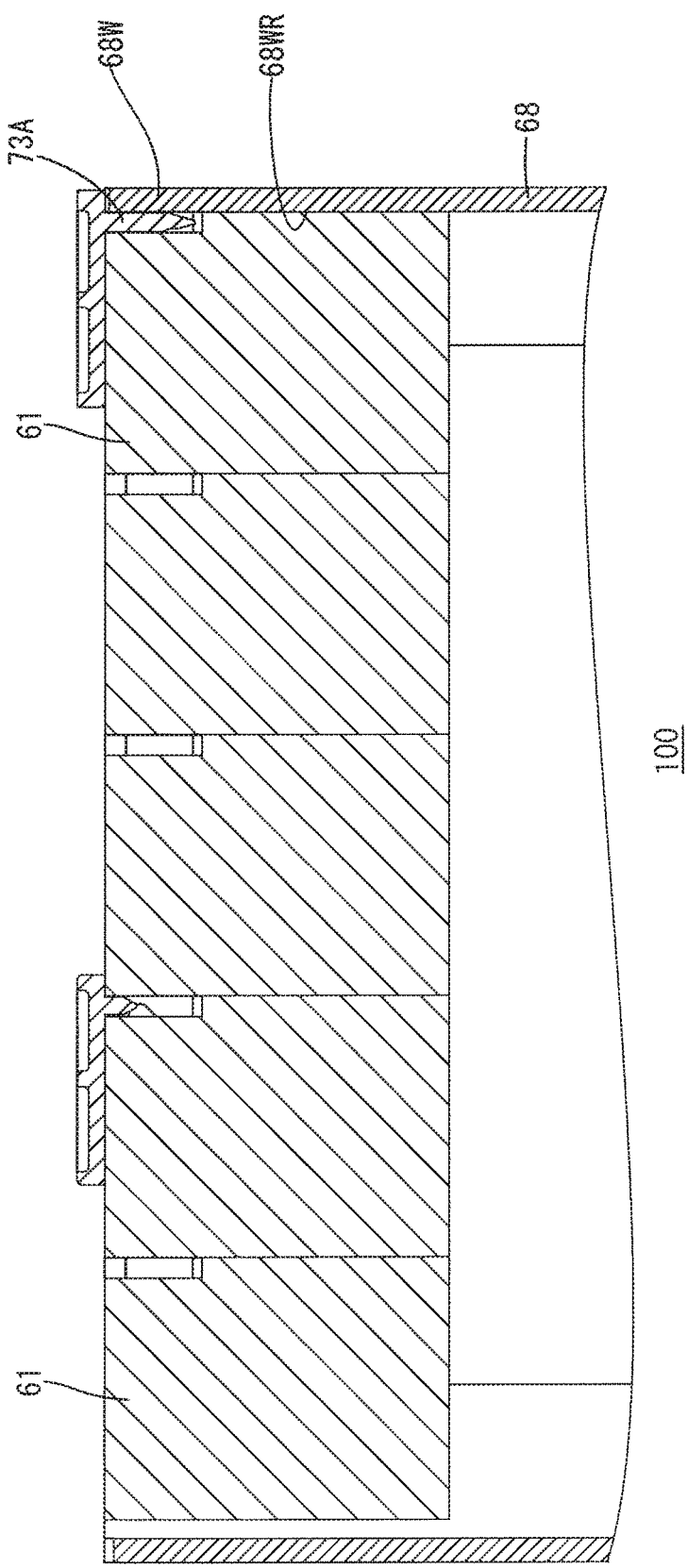
FIG. 16 is a cross-sectional view taken along a line B2-B2 in FIG. 10.

Embodiment 1 will be described with reference to FIGS. 1 to 16. Note that FIG. 12 is an enlarged view of the portion indicated by the region R1 in FIG. 11, and FIG. 14 is an enlarged view of the portion indicated by the region R2 in FIG. 13. The following description will be given, assuming that the direction indicated by the arrow X in FIG. 1 and so forth is the longitudinal direction of electricity storage elements 61, and the direction indicated by the arrow Y in FIG. 1 and so forth is the arrangement direction of the electricity storage elements 61. In the description, it is also assumed that the direction indicated by the arrow Z in FIG. 2 and so forth is the up-down direction. For a plurality of identical members, a reference numeral may be assigned to one member, and reference numerals omitted for the other members.

An electricity storage module 100 to which a connection module 10 according to the present embodiment is to be attached is installed in a vehicle (not shown) such as an electric automobile or a hybrid automobile, and used as a power source for driving the vehicle, for example.

1. Configuration of Electricity Storage Module 100

Figure 1:
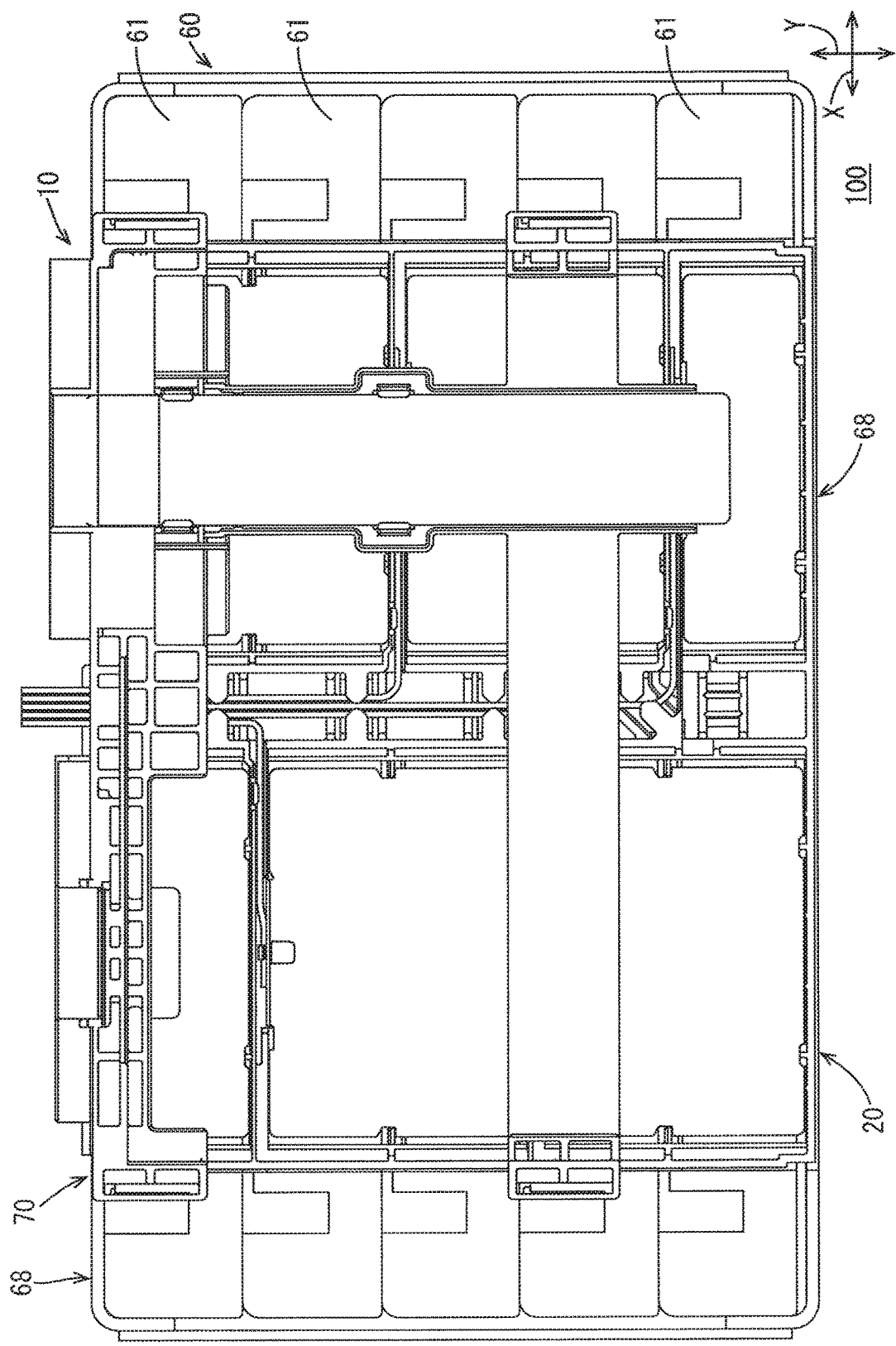
FIG. 1 is a plan view of an electricity storage module including a connection module according to Embodiment 1.
Figure 2:
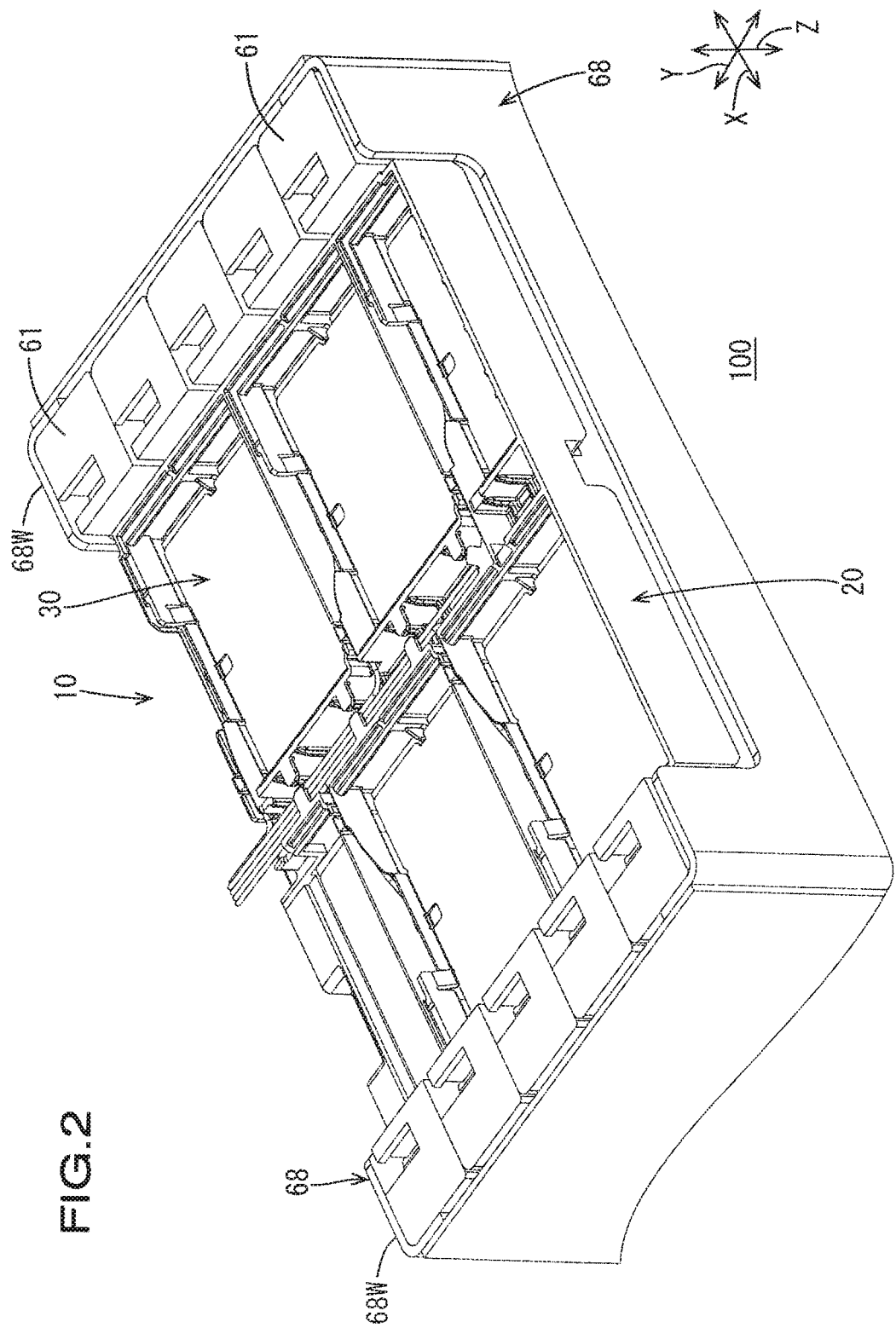
FIG. 2 is a perspective view of the electricity storage module, excluding an external connection busbar protector.

As shown in FIGS. 1 and 2, the electricity storage module 100 is mainly composed of an electricity storage element group 60 formed by arranging a plurality of electricity storage elements 61 side-by-side, and the connection module 10 attached onto the electricity storage element group 60.

1-1. Electricity Storage Element Group 60 and Electricity Storage Elements 61

Figure 3:
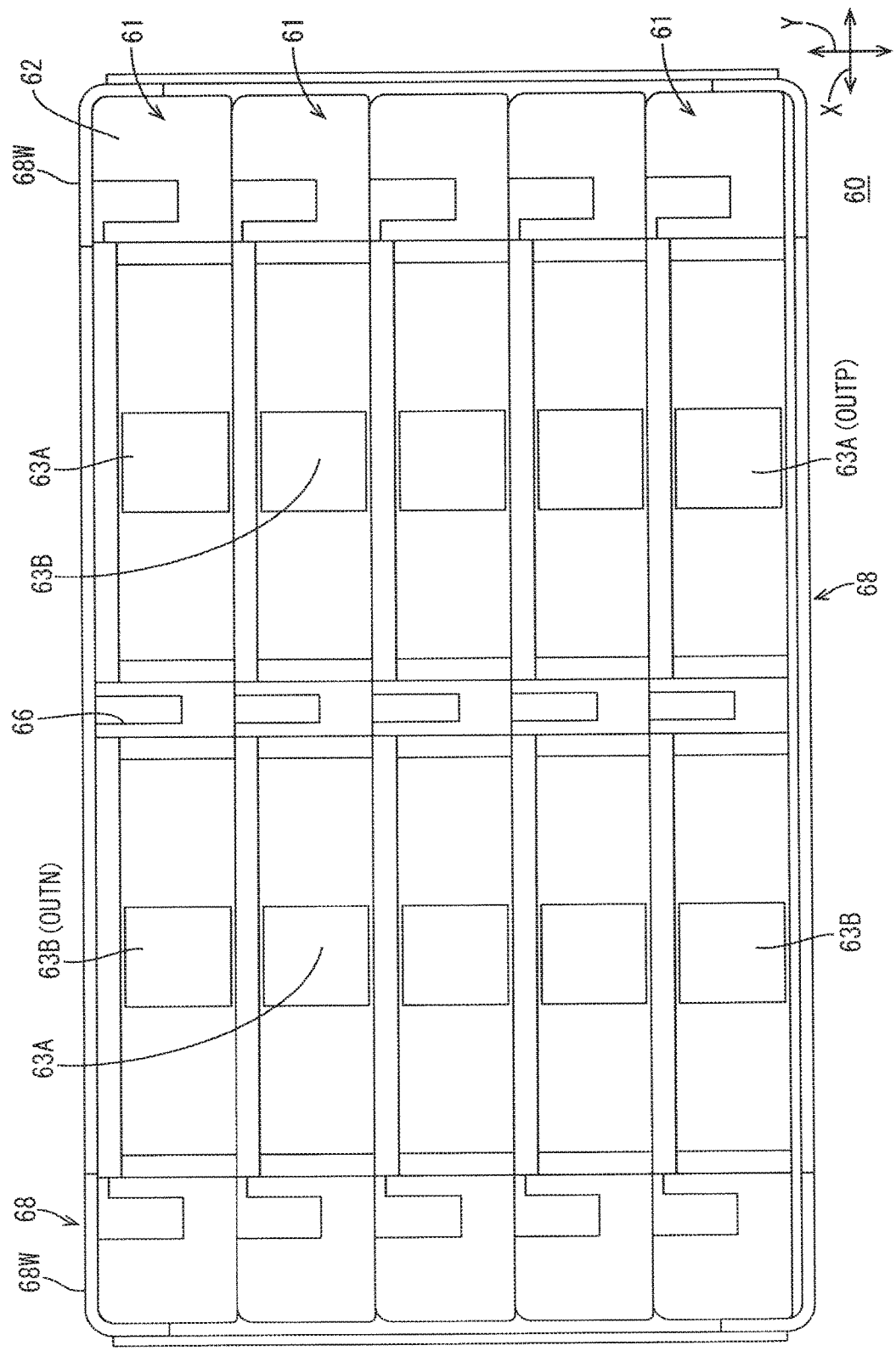
FIG. 3 is a plan view of an electricity storage element group.

Each electricity storage element 61 according to the present embodiment can be a secondary battery, for example. As shown in FIG. 3, a plurality of (five in the present embodiment) electricity storage elements 61 are arranged side-by-side in a row, and form the electricity storage element group 60.

As shown in FIG. 3, a pair of planar electrode terminals 63 are disposed on each of the electricity storage elements 61. One of the pair of electrode terminals 63 is a positive electrode terminal 63A, and the other is a negative electrode terminal 63B. Note that one electrode of each electricity storage element 61 at opposite ends in the arrangement direction of (the arrow Y-direction in FIG. 1) of the electricity storage elements 61 of the electricity storage element group 60 is used as an external connection electrode terminal (OUTP or OUTN). In the present embodiment, for example, a negative electrode terminal 63B is used as a negative electrode output terminal (first output electrode terminal) OUTN, and a positive electrode terminal 63A is used as a positive electrode output terminal (second output electrode terminal) OUTP.

Recesses 66 to which protrusions (not shown) of an insulating protector 20 are fitted are provided in the central portion between each pair of electrode terminals 63, in an electrode arrangement surface 62 of each of the electricity storage elements 61. As a result of the protrusions of the insulating protector 20 being fitted into the recesses 66, the connection module 10 is fixed onto the electricity storage element group 60.

As shown in FIG. 3, the plurality of electricity storage elements 61 are arranged side-by-side such that electrode terminals 63 of different polarities are disposed adjacent to each other in two adjacent electricity storage elements 61 (i.e., the positive electrode terminal 63A of one electricity storage element 61 and the negative electrode terminal 63B of another electricity storage element 61 adjacent thereto are disposed adjacent to each other).

The electricity storage element group 60 includes a frame outer wall 68 that is the outer wall of a frame for accommodating the plurality of electricity storage elements 61, and that is located in the arrangement direction (the arrow Y-direction in FIG. 1) of the plurality of electricity storage elements 61.

2. Connection Module

Figure 4:
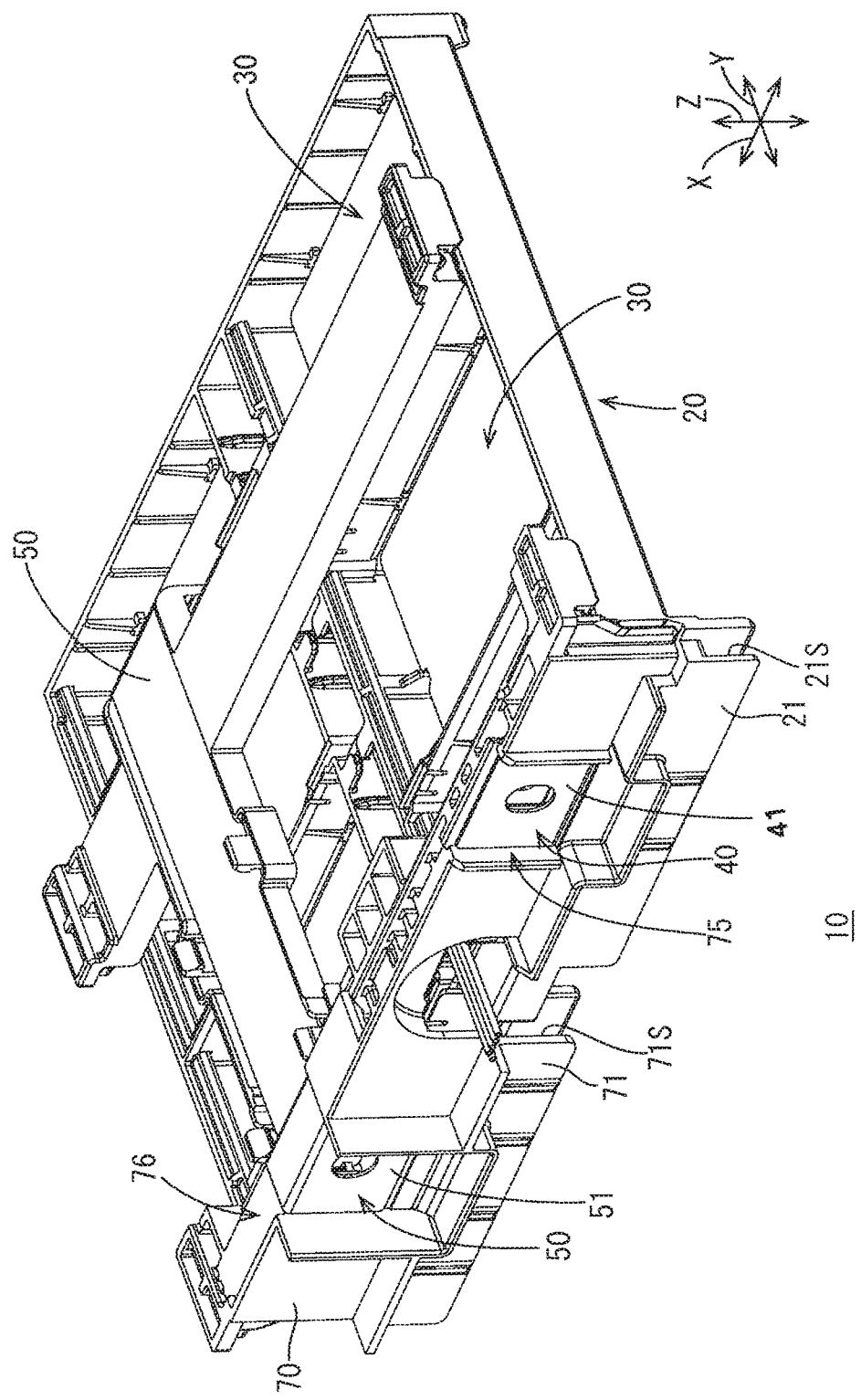
FIG. 4 is a perspective view of the connection module.
Figure 5:
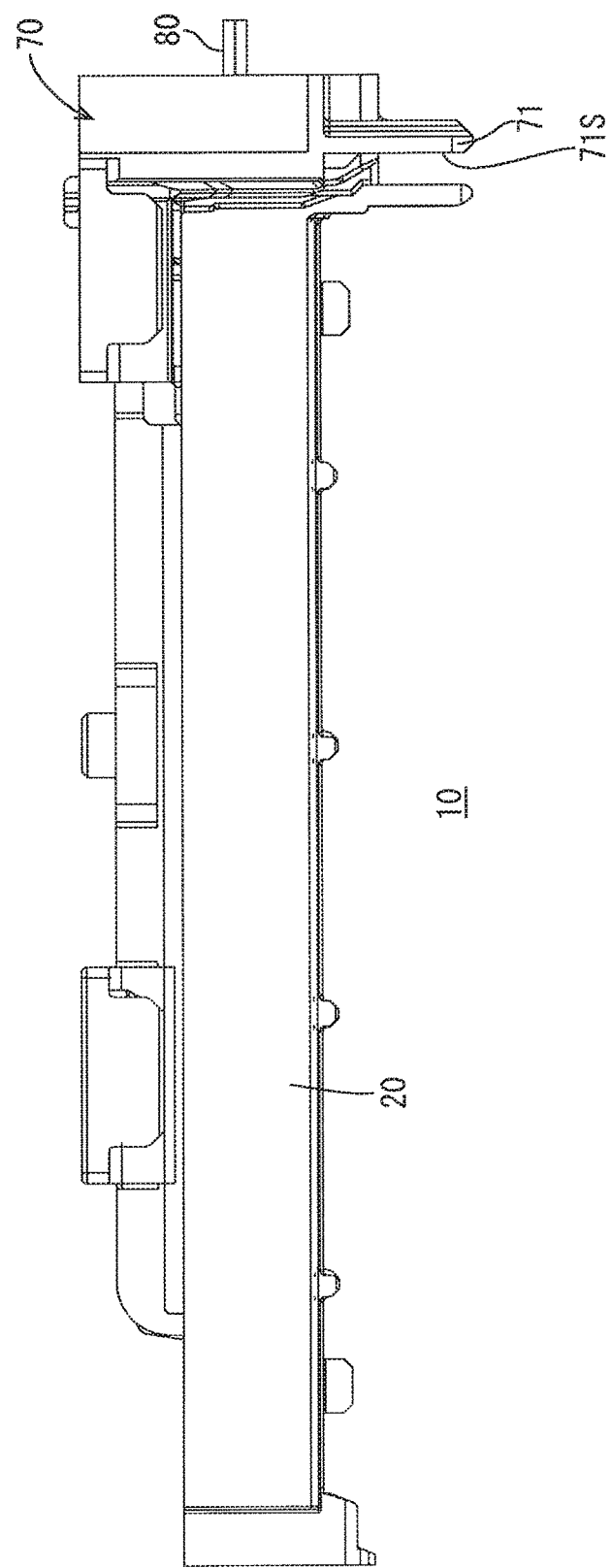
FIG. 5 is a side view of the connection module.

As shown in FIGS. 4, 5, and so forth, the connection module 10 includes: a plurality of busbars 30 that connect the positive electrode terminal 63A and the negative electrode terminal 63B of adjacent electricity storage elements 61; a negative electrode external connection busbar 40 that is electrically connected to the negative electrode output terminal OUTN and to which an external connection component (not shown) is to be bolt-fastened; a positive electrode external connection busbar 50 that is electrically connected to the positive electrode output terminal OUTP and to which an external connection component (not shown) is to be bolt-fastened; and insulating protectors (20 and 70) that hold the plurality of busbars 30, the negative electrode external connection busbar 40, and the positive electrode external connection busbar 50 in an insulated manner. The insulating protector 20 corresponds to a first insulating protector that holds the plurality of busbars 30 in an insulated manner, and the insulating protector 70 corresponds to a second insulating protector that holds the negative electrode external connection busbar 40 and the positive electrode external connection busbar 50 in an insulated manner.

Figure 7:
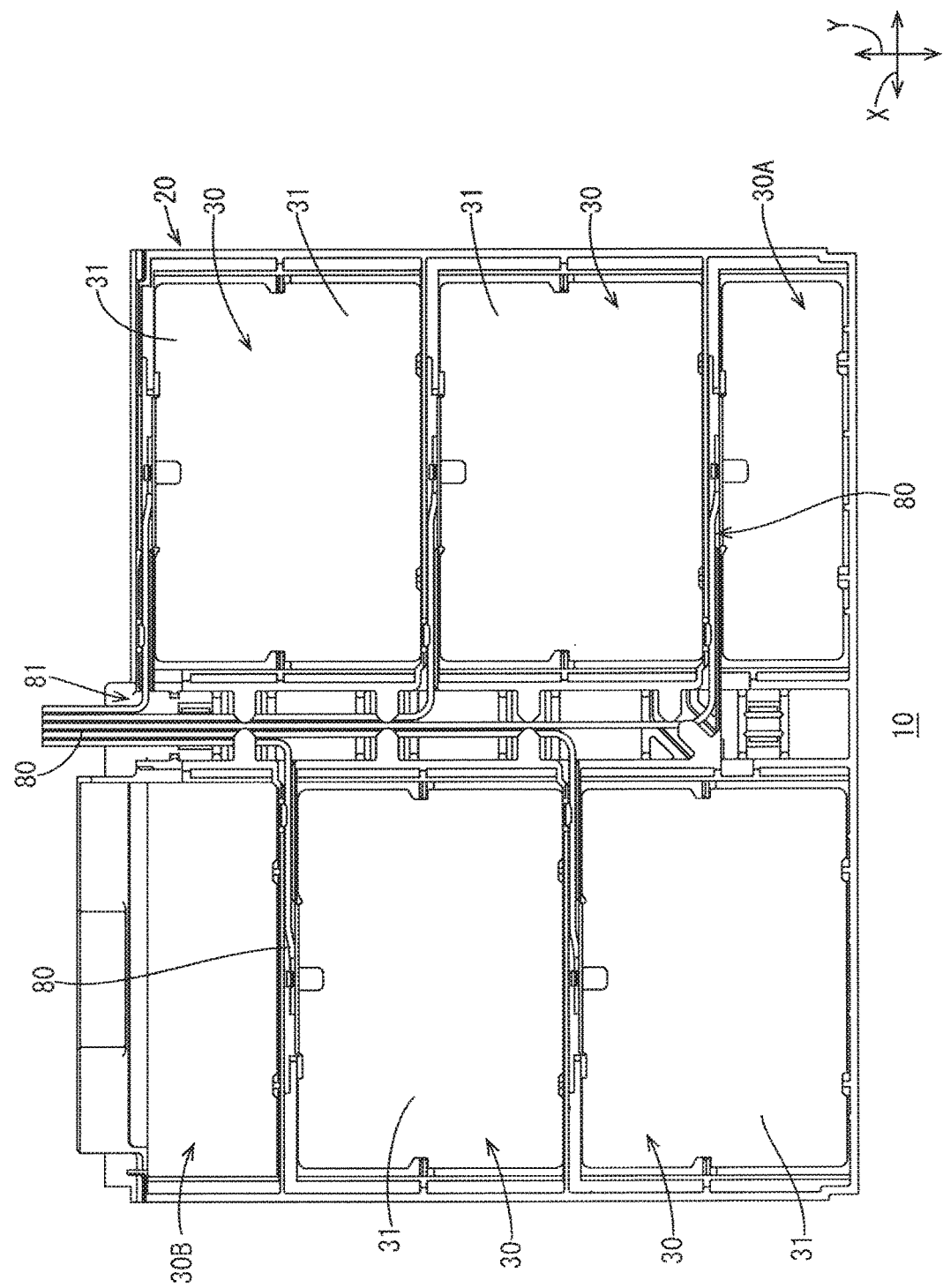
FIG. 7 is a plan view of the connection module, excluding the external connection busbar protector.

Note that, as shown in FIG. 7, the busbars 30 include a busbar 30A that is connected to the positive electrode output terminal OUTP and a busbar 30B that is connected to the negative electrode output terminal OUTN.

Figure 6:
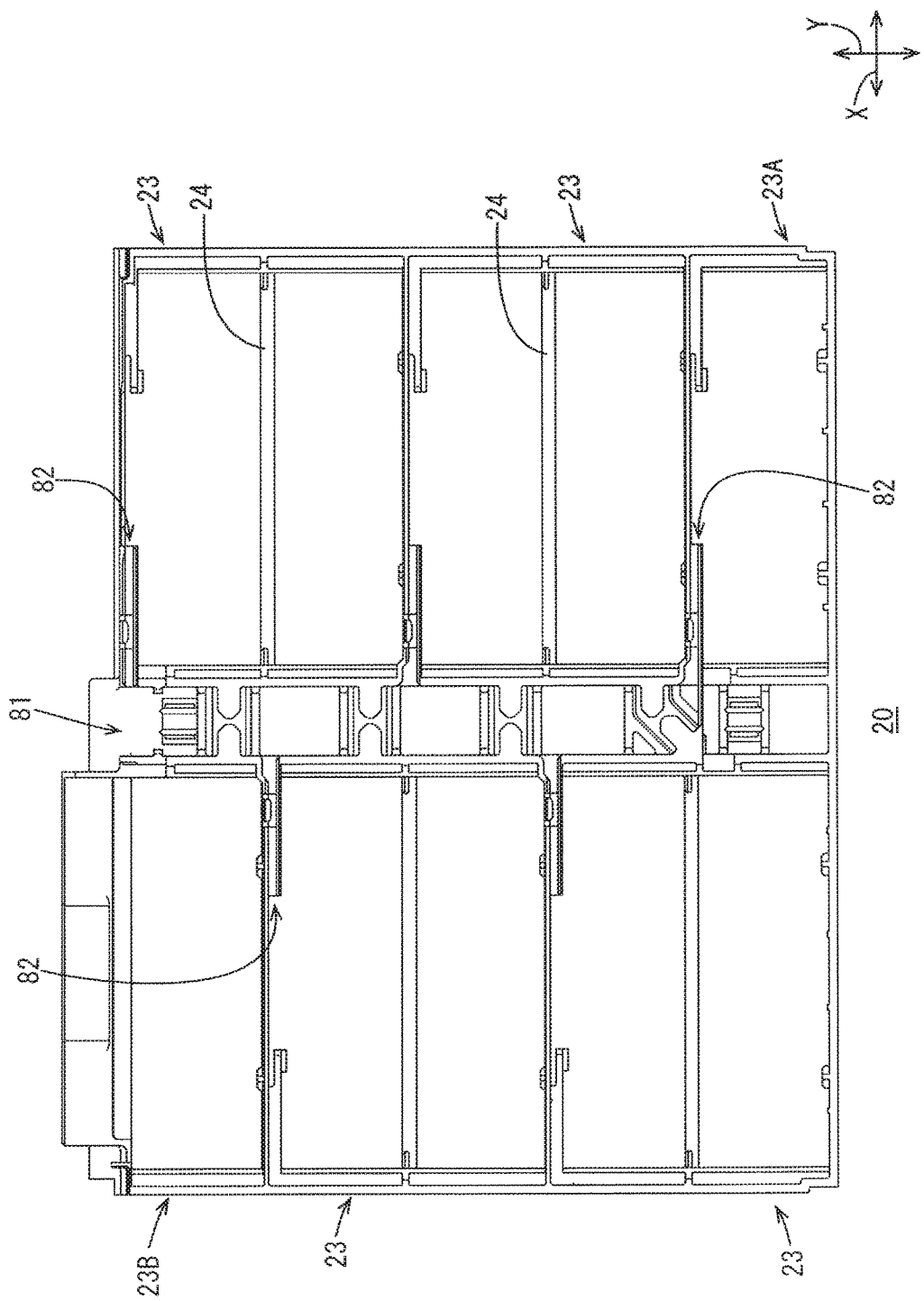
FIG. 6 is a plan view of a terminal connection busbar insulating protector.

As shown in FIG. 6, the insulating protector 20 includes a plurality of busbar accommodating portions (23, 23A, and 23B) that accommodate the busbars 30, strut portions 24 that support the busbars 30, a main routing path 81 and a branch routing path 82 for routing detection wires 80, and so on (see FIG. 7). As shown in FIG. 7, the busbar 30A is accommodated in the busbar accommodating portion 23A, and the busbar 30B is accommodated in the busbar accommodating portion 23B.

Figure 8:
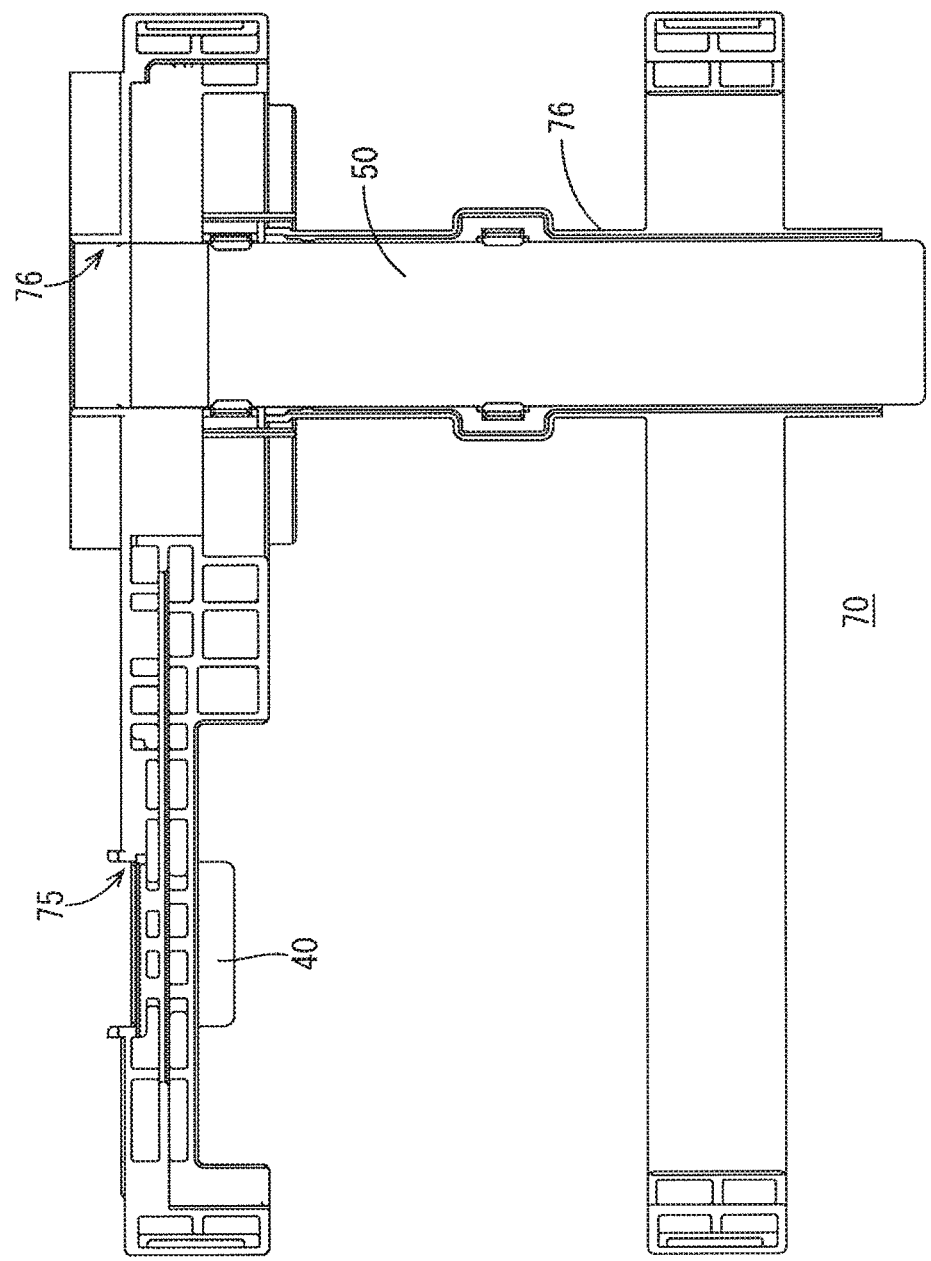
FIG. 8 is a plan view of the external connection busbar protector.

Here, the negative electrode external connection busbar 40 is an example of the first external connection busbar, and includes a first fastening surface 41 that is bolt-fastened to an external connection component. On the other hand, the positive electrode external connection busbar 50 is an example of the second external connection busbar, and includes a second fastening surface 51 that is bolt-fastened to an external connection component. As shown in FIG. 8, the positive electrode external connection busbar 50 has a long rectangular shape in a plan view in order to bring the connection portions between the negative electrode output terminal OUTN and the positive electrode output terminal OUTP and the external connection components close to each other. Note that the technique disclosed in the present specification is not limited thereto. Conversely, the negative electrode external connection busbar 40 may be used as the second external connection busbar, and the positive electrode external connection busbar 50 may be used as the first external connection busbar. The first fastening surface 41 is an example of the first bolt-fastening portion, and the second fastening surface 51 is an example of the second bolt-fastening portion.

The insulating protectors (20 and 70) include respective corresponding support plate portions (21 and 71). The insulating protector 20 is provided with the support plate portion 21, and the insulating protector 70 is provided with the support plate portion 71. The support plate portions (21 and 71) include support plate surfaces (21S and 71S) that face and extend along an outer surface 68S (see FIG. 10) of the frame outer wall 68 in a state in which the connection module 10 is attached to the electricity storage element group 60, and the support plate surfaces (21S and 71S) abut against the outer surface 68S of the frame outer wall 68 so as to support the insulating protectors (20 and 70) when external connection components are bolt-fastened to the negative electrode external connection busbar 40 and the positive electrode external connection busbar 50.

In other words, the support plate portions (21 and 71) include a support plate portion 21 (see FIGS. 10, 11, and 12) located in the vicinity of the first fastening surface 41 and a support plate portion 71 (see FIGS. 10, 13, and 14) located in the vicinity of the second fastening surface 51 in a state in which the connection module 10 is attached to the electricity storage element group 60.

As shown in FIG. 4, the support plate portions (21 and 71) have an elongated plate shape extending in a direction (the arrow X-direction in FIG. 4) perpendicular to the arrangement direction of the plurality of electricity storage elements 61. Accordingly, the area where the support plate portions (21 and 71) abut against the frame outer wall 68 increases. This makes it possible to release the load due to bolt-fastening more effectively to the frame outer wall 68. The support plate portions (21 and 71) are provided corresponding to, and separately in the vicinity of, the first fastening surface 41 or the second fastening surface 51. Accordingly, the load due to bolt-fastening can be partially released to the frame outer wall 68, in a manner appropriately corresponding to the positions of the first fastening surface 41 of the negative electrode external connection busbar 40 and the second fastening surface 51 of the positive electrode external connection busbar 50. Note that the support plate portion may be formed by a single support plate portion, without being separated into the support plate portion 21 and the support plate portion 71.

As shown in FIGS. 4 and 8, the insulating protector 70 includes a first external connection busbar holding portion 75 that holds the negative electrode external connection busbar 40, and a second external connection busbar holding portion 76 that holds the positive electrode external connection busbar 50. Then, the support plate portions (21 and 71) are provided corresponding to the first external connection busbar holding portion 75 and the second external connection busbar holding portion 76, respectively. With this configuration, the load applied to the external connection busbar holding portions (75 and 76) of the insulating protector 70 due to bolt-fastening can be partially released to the frame outer wall 68 when the external connection busbar holding portions (75 and 76) that respectively hold the negative electrode external connection busbar 40 and the positive electrode external connection busbar 50 are provided separately and spaced apart from each other in the insulating protector 70 as in Embodiment 1.

The support plate portion 21 corresponding to the first external connection busbar holding portion 75 is provided in a portion of the insulating protector 20 separate from the first external connection busbar holding portion 75. On the other hand, the support plate portion 71 corresponding to the second external connection busbar holding portion 76 is provided as one piece with the second external connection busbar holding portion 76 of the insulating protector 70.

This configuration facilitates the operation of attaching the negative electrode external connection busbar 40 to the first external connection busbar holding portion 75 in a configuration in which the negative electrode external connection busbar 40 and the positive electrode external connection busbar 50 are connected to external connection components on the same side of the connection module 10 as in Embodiment 1.

That is, in a configuration in which the negative electrode external connection busbar 40 and the positive electrode external connection busbar 50 are connected to the external connection components on the same side of the connection module 10, the portion to be connected to the external connection component and the portion to be connected to the negative electrode output terminal OUTN of the electricity storage element 61 are located close to each other in one (the negative electrode external connection busbar 40 in the present embodiment) of the external connection busbars. Therefore, if the first external connection busbar holding portion 75 is provided with the support plate portion 21, it is difficult to secure space for attaching the negative electrode external connection busbar 40 to the first external connection busbar holding portion 75. This makes it difficult to perform the attachment operation. However, by providing the support plate portion 21 in a portion (the insulating protector 20 in the present embodiment) separate from the first external connection busbar holding portion 75, it is possible to secure sufficient attachment space, thus facilitating the attachment operation.

Figure 10:
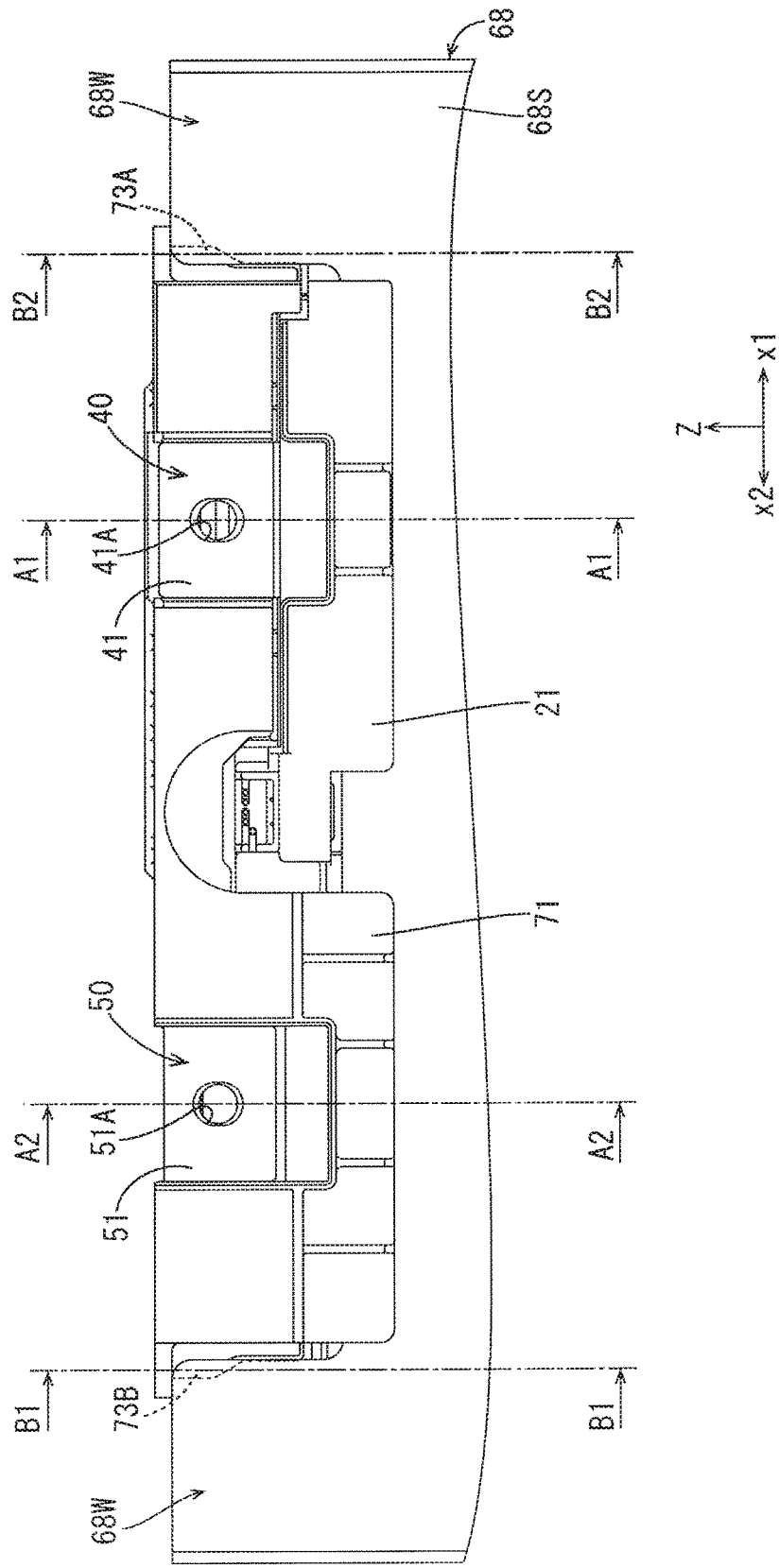
FIG. 10 is a front view of the electricity storage module.

As shown in FIG. 10, the frame outer wall 68 includes an extended portion 68W that is located on the outer side (the arrow X1-direction side in FIG. 10) of the first fastening surface 41 and the outer side (the arrow X2-direction side in FIG. 10) of the second fastening surface 51 in a front view in a state in which the connection module 10 is attached to the electricity storage element group 60.

Figure 9:
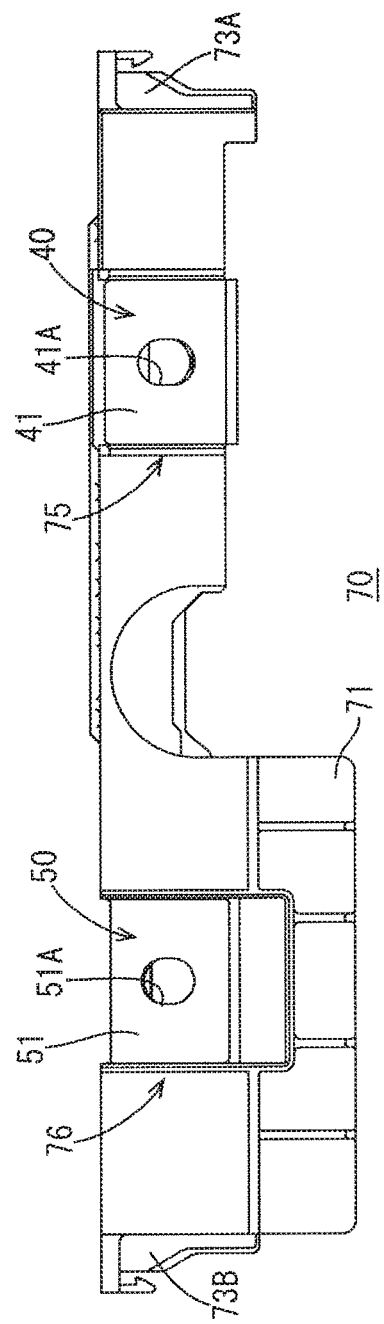
FIG. 9 is a front view of the external connection busbar protector.

The insulating protector 70 includes inner surface abutting portions 73 that abut against an inner surface 68R of the frame outer wall 68 when the negative electrode external connection busbar 40 and the positive electrode external connection busbar 50 are bolt-fastened to the external connection components. Specifically, as shown in FIG. 9 and so forth, the insulating protector 70 includes, as the inner surface abutting portions 73, a first abutting piece portion 73A and a second abutting piece portion 73B.

The first abutting piece portion 73A and the second abutting piece portion 73B correspond to inner surface abutting portions that abut against the inner surface 68R of the frame outer wall 68 when the negative electrode external connection busbar 40 and the positive electrode external connection busbar 50 are bolt-fastened to external connection components. The first abutting piece portion 73A is formed in the vicinity of the first fastening surface 41, and abuts against an inner surface 68WR of the extended portion 68W during bolt-fastening (see FIG. 16). On the other hand, the second abutting piece portion 73B is formed in the vicinity of the second fastening surface 51, and abuts against the inner surface 68WR of the extended portion 68W during bolt fastening (see FIG. 15). Accordingly, if the insulating protector 70 is inclined in the horizontal direction during bolt-fastening, the load applied to the insulating protector 70 due to bolt-fastening can be partially released to the frame outer wall 68 more effectively by the first abutting piece portion 73A and the second abutting piece portion 73B working cooperatively with the support plate portions (21 and 71).

As described above, in Embodiment 1, the insulating protector includes the insulating protector 20 (an example of the first insulating protector) that holds the plurality of busbars 30, and the insulating protector 70 (an example of the second insulating protector) that holds the negative electrode external connection busbar 40 and the positive electrode external connection busbar 50. Then, the support plate portion 21 associated with the negative electrode external connection busbar 40 is provided on the insulating protector 20, and the support plate portion 71 associated with the positive electrode external connection busbar 50 is provided on the insulating protector 70. Accordingly, the load applied to the insulating protectors (20 and 70) due to bolt-fastening can be favorably reduced in a configuration in which the insulating protector is separated into the insulating protector 20 that holds the plurality of busbars 30 and the insulating protector 70 that holds the external connection busbars (40 and 50) as in Embodiment 1.

As shown in FIG. 10, the negative electrode external connection busbar 40 includes the first fastening surface 41 that has a bolt hole 41A through which the external connection component is bolt-fastened, and the positive electrode external connection busbar 50 includes the second fastening surface 51 that has a bolt hole 51A through which the external connection component is bolt-fastened. Then, the directions of perpendicular lines of the first fastening surface 41, the second fastening surface 51, the support plate surfaces (21S and 71S) of the support plate portions (21 and 71), and the outer surface 68S of the frame outer wall 68 are the same direction, which is the arrangement direction of (the arrow Y-direction in FIG. 1, etc.) of the electricity storage elements 61. Accordingly, the load applied to the insulating protectors (20 and 70) due to bolt-fastening can be reduced when bolt-fastening to the first fastening surface 41 and the second fastening surface 51 is performed in the arrangement direction of the electricity storage elements 61, or in other words, in a configuration in which the first fastening surface 41 and the second fastening surface 51 are provided in a direction perpendicular to the terminal connection surfaces of the external connection busbars (40 and 50) as in Embodiment 1.

3. Effects of Embodiment 1

In Embodiment 1, the insulating protectors (20 and 70) are provided with the support plate portions (21 and 71) including the support plate surfaces (21S and 71S) that abut against the outer surface 68S of the frame outer wall 68 when the external connection components are bolt-fastened to the negative electrode external connection busbar (first external connection busbar) 40 and the positive electrode external connection busbar (second external connection busbar) 50.

Accordingly, the load applied to the insulating protectors (20 and 70) due to bolt-fastening during bolt-fastening can be partially released to the frame outer wall 68. This makes it possible to inhibit damage such as deformation due to bolt-fastening from occurring in the insulating protectors (20 and 70). That is, the load applied to the insulating protectors (20 and 70) due to bolt-fastening can be reduced in a configuration in which the external connection components are bolt-fastened to the external connection busbars (40 and 50).

Here, the term "to abut against" used in relation to the support plate surfaces (21S and 71S) also encompasses "to abut against before bolt-fastening". That is, it is possible to adopt a configuration in which the support plate surfaces (21S and 71S) abut against the outer surface 68S of the frame outer wall 68 before bolt-fastening is performed, when the connection module 10 is attached to the electricity storage element group 60. In this case as well, the load applied to the insulating protectors (20 and 70) due to bolt-fastening during bolt-fastening can be partially released to the frame outer wall 68.

The insulating protector 70 includes the inner surface abutting portion 73 that abuts against the inner surface 68R of the frame outer wall 68 when the negative electrode external connection busbar 40 and the positive electrode external connection busbar 50 are bolt-fastened to the external connection components. Specifically, the insulating protector 70 includes the first abutting piece portion 73A serving as the inner surface abutting portion 73 that abuts against the inner surface 68WR of the extended portion 68W of the frame outer wall 68, the first abutting piece portion 73A being formed in the vicinity of the first fastening surface 41, and the second abutting piece portion 73B serving as the inner surface abutting portion 73 that abuts against the inner surface 68WR of the extended portion 68W, the second abutting piece portion 73B being formed in the vicinity of the second fastening surface 51.

Accordingly, if the insulating protectors (20 and 70) are inclined in the horizontal direction during bolt-fastening, the load applied to the insulating protectors (20 and 70) due to bolt-fastening can be partially released to the frame outer wall 68 more effectively by the first abutting piece portion 73A and the second abutting piece portion 73B working cooperatively with the support plate portions (21 and 71).

Specifically, if a force that causes the insulating protector 70 to be inclined relative to the frame outer wall 68 is exerted as a result of a force in a direction shifted from the bolt axial direction being applied to the bolt when the first fastening surface 41 is subjected to bolt-fastening, the second abutting piece portion 73B located at a position away from the first fastening surface 41 can abut against the inner surface 68WR of the frame outer wall (extended portion 68W) 68, thus releasing the stress to the frame outer wall 68. On the other hand, if a force that causes the insulating protectors (20 and 70) to be inclined relative to the frame outer wall 68 is exerted as a result of a force in a direction shifted from the bolt axial direction being applied to the bolt when the second fastening surface 51 is subjected to bolt-fastening, the first abutting piece portion 73A located at a position away from the second fastening surface 51 can abut against the inner surface 68WR of the frame outer wall (extended portion 68W) 68, thus releasing the stress to the frame outer wall 68. That is, the first abutting piece portion 73A is disposed at a position away from the second fastening surface 51, and the second abutting piece portion 73B is disposed at a position away from the first fastening surface 41. Accordingly, if a force in a direction shifted from the axial direction of the bolt is applied to a bolt during bolt-fastening, the stress can be more effectively released to the frame outer wall 68.

Note that as in the case of the support plate surfaces (21S and 71S), the term "to abut against" used in relation to the inner surface abutting portion 73 also encompasses "to abut against before bolt-fastening".

Embodiment 2

Next, a connection module 10A according to Embodiment 2 will be described with reference to FIGS. 17 to 19. The connection module 10A is different from the connection module 10 according to Embodiment 1 with regard to the configuration of external connection busbars (30C and 30D) and the configuration of the insulating protectors (20 and 70) that hold the external connection busbars (30C and 30D).

Figure 17:
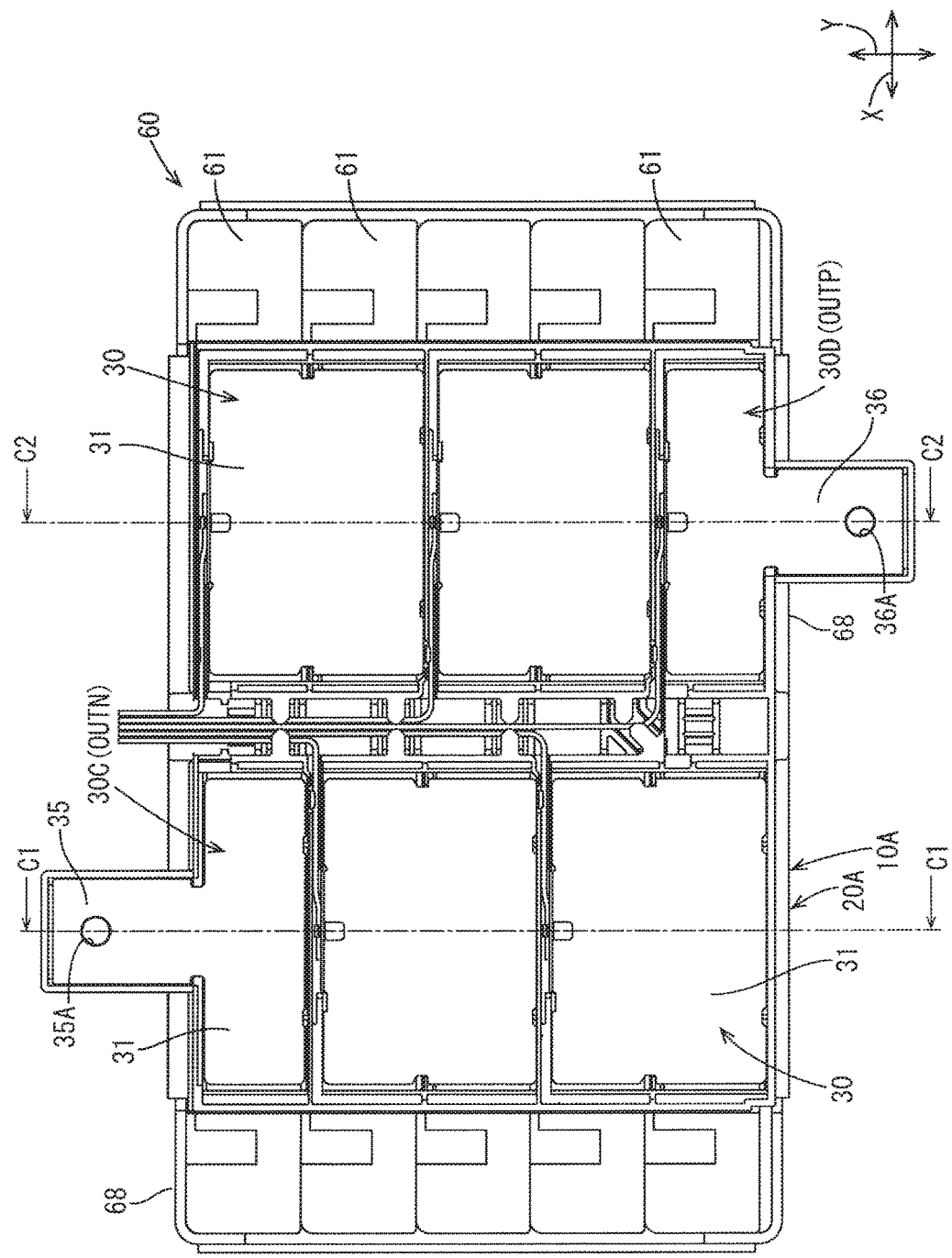
FIG. 17 is a plan view of an electricity storage module including a connection module according to Embodiment 2.

That is, in Embodiment 2, the insulating protector is formed by one insulating protector 20A as shown in FIG. 17. The insulating protector 20A holds the external connection busbars (30C and 30D) and the busbars 30.

The external connection busbar 30C corresponds to the negative electrode external connection busbar 40 in Embodiment 1, and the external connection busbar 30D corresponds to the positive electrode external connection busbar 50 in Embodiment 1. A bolt-fastening surface 35 of the external connection busbar 30C and a bolt-fastening surface 36 of the external connection busbar 30D are on the same plane as electrode connection surfaces 31 of the busbars 30.

Figure 18:
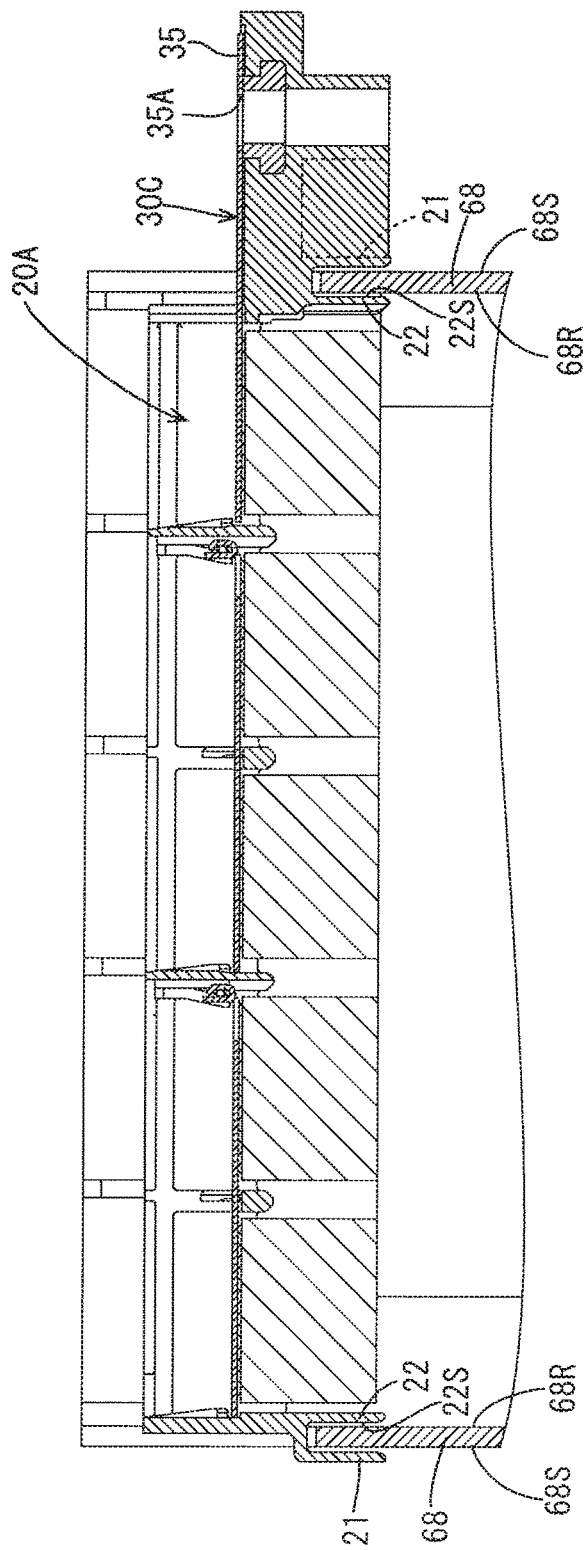
FIG. 18 is a cross-sectional view taken along a line C1-C1 in FIG. 17.
Figure 19:
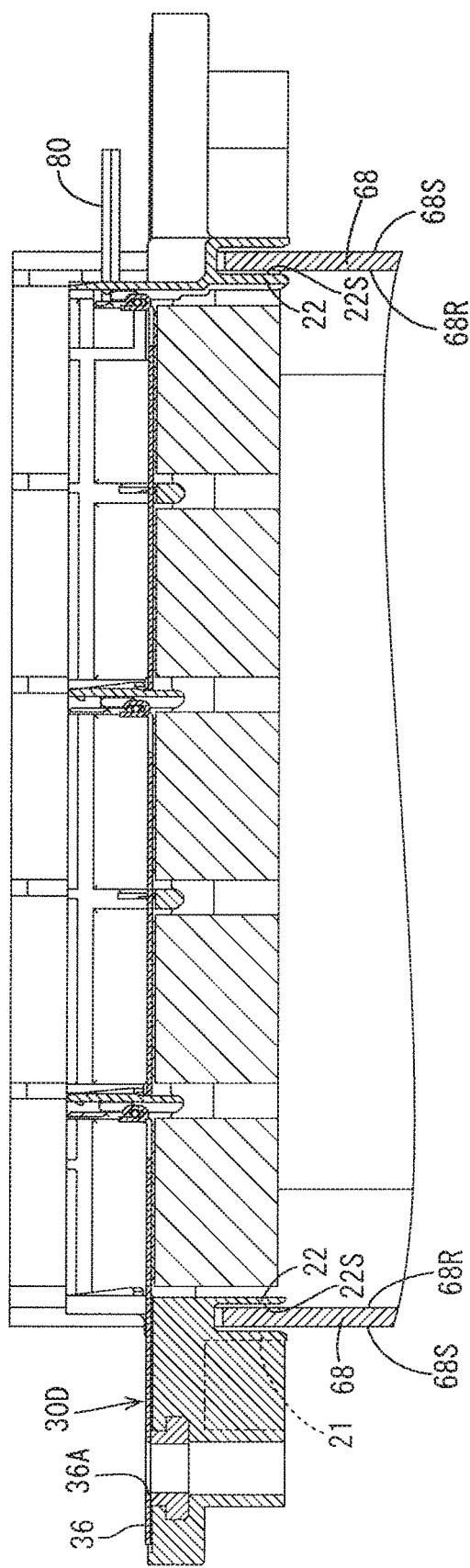
FIG. 19 is a cross-sectional view taken along a line C2-C2 in FIG. 17.

As shown in FIGS. 18 and 19, the insulating protector 20A includes filler plate portions 22 serving as inner surface abutting portions. Each filler plate portion 22 has an elongated plate shape extending in a direction (the arrow X-direction in FIG. 17) perpendicular to the arrangement direction of the plurality of electricity storage elements 61 as in the case of the support plate portion 21. This increases the area where the filler plate surfaces 22S of the filler plate portions 22 abut against the inner surface 68R of the frame outer wall 68. Accordingly, if a force that causes the insulating protector 20A to be inclined relative to the frame outer wall 68 is exerted as a result of a force in a direction shifted from the bolt axial direction is applied to a bolt during bolt-fastening, the load due to bolt-fastening can be more effectively released to the frame outer wall 68.

That is, in Embodiment 2, bolt-fastening to a bolt-fastening hole 35A of the external connection busbar 30C and a bolt-fastening hole 36A of the external connection busbar 30D is performed in the vertical direction relative to the electrode connection surfaces 31. In this case as well, as shown in FIGS. 18 and 19, the insulating protector 20A is provided with the same support plate portion 21 as that in Embodiment 1 and the filler plate portions 22, and therefore the load due to bolt-fastening can be released to the frame outer wall 68, thus making it possible to reduce the load applied to the insulating protector 20A.

OTHER EMBODIMENTS

The technique disclosed in the present specification is not limited to the above described and illustrated embodiments. For example, the following embodiment is also included in the technical scope thereof.

Figure 20:
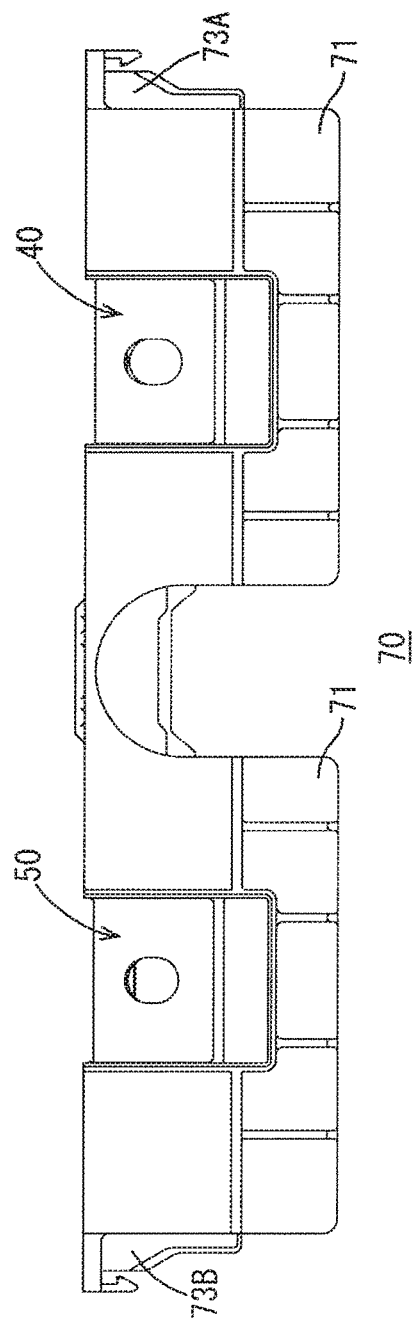
FIG. 20 is a side view showing an example of an external connection busbar protector in another connection module.

(1) In Embodiment 1 described above, an example is shown in which the insulating protector 20 is provided with the support plate portion 21 associated with the negative electrode external connection busbar 40, and the insulating protector 70 is provided with the support plate portion 71 associated with the positive electrode external connection busbar 50. However, the technique disclosed in the present specification is not limited thereto. As shown in FIG. 20, the insulating protector 70 may be provided with support plate portions associated with the negative electrode external connection busbar 40 and the positive electrode external connection busbar 50.

LIST OF REFERENCE NUMERALS

10: Connection module
20: Insulating protector (first insulating protector)
21: Support plate portion (first support plate portion)
21S: Support plate surface of support plate portion
22: Filler plate portion (inner surface abutting portion)
22S: Filler plate surface
30: Busbar
40: Negative electrode external connection busbar (first external connection busbar)
41: First fastening surface (first bolt-fastening portion)
41A: Bolt hole
50: Positive electrode external connection busbar (second external connection busbar)
51: Second fastening surface (second bolt-fastening portion)
51A: Bolt hole
60: Electricity storage element group
61: Electricity storage element
63: Electrode terminal
63A: Positive electrode terminal
63B: Negative electrode terminal
68: Frame outer wall
68W: Extended portion of frame outer wall
70: Insulating protector (second insulating protector)
71: Support plate portion (second support plate portion)
71S: Support plate surface of support plate portion
73A: First abutting piece portion (inner surface abutting portion)
73B: Second abutting piece portion (inner surface abutting portion)
OUTN: Negative electrode output terminal (first output electrode terminal)

OUTP: Positive electrode output terminal (second output electrode terminal)

What is claimed is:

1. A connection module that is to be attached to an electricity storage element group including a plurality of electricity storage elements each having positive and negative electrode terminals, the electricity storage element group including: a first output electrode terminal that outputs power of one polarity; a second output electrode terminal that outputs power of another polarity; and a frame outer wall that is an outer wall of a frame for accommodating the plurality of electricity storage elements, the frame outer wall being located in an arrangement direction of the plurality of electricity storage elements, the connection module comprising:

a plurality of busbars configured to connect the positive electrode terminal and the negative electrode terminal of adjacent electricity storage elements;

a first external connection busbar that is configured to be electrically connected to the first output electrode terminal, and that includes a first bolt-fastening portion to which an external connection component is to be bolt-fastened;

a second external connection busbar that is configured to be electrically connected to the second output electrode terminal, and that includes a second bolt-fastening portion to which an external connection component is to be bolt-fastened; and an insulating protector configured to hold the plurality of busbars, the first external connection busbar, and the second external connection busbar in an insulated manner, wherein the insulating protector includes a support plate portion that includes a support plate surface that faces and extends along an outer surface of the frame outer wall in a condition in which the connection module is attached to the electricity storage element group, at least the support plate surface being configured to abut against the outer surface of the frame outer wall so as to support the insulating protector when the external connection components are bolt-fastened to the first external connection busbar and the second external connection busbar.

2. The connection module according to claim 1, wherein the insulating protector includes an inner surface abutting portion configured to abut against an inner surface of the frame outer wall when the first external connection busbar and the second external connection busbar are bolt-fastened to the external connection components.

3. The connection module according to claim 2, wherein the frame outer wall includes an extended portion that is located on an outer side of the first bolt-fastening portion and the second bolt-fastening portion in a plan view in a condition in which the connection module is attached to the electricity storage element group, and the insulating protector includes:

a first abutting piece portion serving as the inner surface abutting portion configured to abut against an inner surface of the extended portion, the first abutting piece portion being formed in the vicinity of the first bolt-fastening portion; and a second abutting piece portion serving as the inner surface abutting portion configured to abut against the inner surface of the extended portion, the second abutting piece portion being formed in the vicinity of the second bolt-fastening portion.

4. The connection module according to claim 1, wherein the support plate portion includes a first support plate portion located in the vicinity of the first bolt-fastening portion and a second support plate portion located in the vicinity of the second bolt-fastening portion in a condition in which the connection module is attached to the electricity storage element group.

5. The connection module according to claim 1, wherein the insulating protector includes:

a first insulating protector configured to hold the plurality of busbars; and a second insulating protector configured to hold the first external connection busbar and the second external connection busbar, and the support plate portion includes:

a support plate portion associated with the first external connection busbar which is provided on the first insulating protector, and a support plate portion associated with the second external connection busbar which is provided on the second insulating protector.

6. The connection module according to claim 1, wherein the support plate portion has an elongated plate shape extending in a direction perpendicular to the arrangement direction of the plurality of electricity storage elements.

7. The connection module according to claim 2, wherein the inner surface abutting portion has an elongated plate shape extending in a direction perpendicular to the arrangement direction of the plurality of electricity storage elements.

8. The connection module according to claim 1, wherein the first external connection busbar includes a first fastening surface having a bolt hole through which the external connection component is to be bolt-fastened, the second external connection busbar includes a second fastening surface having a bolt hole through which the external connection component is to be bolt-fastened, and directions of perpendicular lines of the first fastening surface, the second fastening surface, the support plate surface of the support plate portion, and the outer surface of the frame outer wall are the same direction, which is the arrangement direction of the electricity storage elements.

* * * * *